US006498917B2

(12) United States Patent
Takami

(10) Patent No.: US 6,498,917 B2
(45) Date of Patent: *Dec. 24, 2002

(54) IMAGE FORMING APPARATUS FOR ENHANCING THE DURABILITY OF A VIBRATION PREVENTING MEMBER AND PROTECTING A ROTARY UNIT FROM DEFECTIVE ROTATION

(75) Inventor: Nobuo Takami, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/865,520

(22) Filed: May 29, 2001

(65) Prior Publication Data

US 2002/0001484 A1 Jan. 3, 2002

(30) Foreign Application Priority Data

May 29, 2000 (JP) ....................................... 2000-159112

(51) Int. Cl.$^{7}$ ........................... G03G 15/01; H02K 5/24
(52) U.S. Cl. .......................................... 399/227; 310/51
(58) Field of Search ................................ 399/167, 222, 399/223, 226, 227; 310/51, 75 R, 89, 91; 248/637, 638

(56) References Cited

U.S. PATENT DOCUMENTS 5,325,151 A * 6/1994 Kimura et al. .............. 399/227
5,420,664 A * 5/1995 Miwa et al. ................ 399/167
5,881,342 A * 3/1999 Makino et al. ............. 399/167
5,926,670 A 7/1999 Furuta et al. ............... 399/101
5,970,278 A 10/1999 Munakata .................... 399/46
5,983,060 A 11/1999 Namekata et al. .......... 399/297
6,006,062 A 12/1999 Takahashi et al. .......... 399/310
6,091,922 A 7/2000 Bisaiji ........................ 399/297
6,108,501 A 8/2000 Nagai ......................... 399/116
6,195,519 B1 2/2001 Isobe et al. ................. 399/227
6,223,008 B1 4/2001 Takahashi et al. ............ 399/66
6,259,879 B1 7/2001 Bisaiji ........................ 399/296
6,269,228 B1 7/2001 Kayahara et al. ............. 399/37
6,285,099 B1 * 9/2001 Takami ........................ 310/51

FOREIGN PATENT DOCUMENTS

JP 11-295961 10/1999
JP 2000-235292 8/2000

* cited by examiner

*Primary Examiner*—Hoan Tran
(74) *Attorney, Agent, or Firm*—Oblon, Spivak, McClelland, Maier & Neustadt, P.C.

(57) ABSTRACT

An image forming apparatus includes a developing unit implemented as a revolver or rotary unit driven by a revolver motor, which includes a motor case. A motor support member supports the surface of the motor case at a position beneath the center of gravity of the revolver motor. The motor support member reduces a moment acting on a motor mount about the apparent center of rotation of the revolver motor due the weight of the motor to substantially zero. This configuration enhances the durability of the motor mount or vibration preventing member and thereby protects the revolver from defective rotation.

6 Claims, 11 Drawing Sheets

IMAGE FORMING APPARATUS FOR ENHANCING THE DURABILITY OF A VIBRATION PREVENTING MEMBER AND PROTECTING A ROTARY UNIT FROM DEFECTIVE ROTATION

BACKGROUND OF THE INVENTION

The present invention relates to a copier, printer, facsimile apparatus or similar electrophotographic image forming apparatus. More particularly, the present invention relates to an image forming apparatus of the type including a rotary unit rotatable relative to an apparatus body and a drive unit for causing the rotary unit to rotate to and stop at a preselected position.

Today, a color image forming apparatus of the type including a revolver type developing unit, which is a specific form of a rotary unit, is extensively used. To enhance high-speed operation and high durability, it is necessary with the apparatus of the type described to reduce a color switching time, i.e., to rotate the revolver at high speed. It is also necessary to provide the revolver with rigidity high enough to withstand sharp drive and stop and to guarantee an accurate development gap. Further, the diameter of a developing roller must be increased to cope with high linear velocity for development. In addition, the amount of developer must be increased in order to extend a maintenance period. However, higher rigidity, larger roller diameter and greater amount of developer increase the size and weight of the revolver. This results in the need for a revolver drive motor having power great enough to drive the revolver increased in the moment of inertia at high speed.

The great power, revolver drive motor must be accompanied by a sufficient measure against vibration. The vibration of the motor effects, e.g., writing accuracy and thereby brings about jitter images when transferred to the apparatus body. In addition, the vibration turns out high-frequency noise that annoys the operator of the apparatus. It is a common practice to position a motor mount or vibration preventing member, which includes a rubber member, between the apparatus body and a motor mounting surface for thereby intercepting the vibration of the motor. The motor mount may be implemented by, e.g., a pair of metal plates adhered to opposite sides of a rubber member. However, it was experimentally found that such a motor mount broke due to aging when applied to a drive unit for driving the revolver. Not only the revolver but also other rotary units suffer from such damage.

Japanese patent laid-open publication No. 11-035091, for example, discloses an image forming apparatus including a vibration preventing member and a motor position restricting member. The vibration preventing member intervenes between a motor case mounting surface substantially perpendicular to the axis of a motor member. The motor position restricting member contacts or adjoins a motor case surface substantially parallel to the axis of the motor member. The apparatus taught in the above document is constructed to shut off vibration and noise ascribable to a motor member that drives a driven gear mounted on a rotary unit via a drive gear. The motor position restricting member is configured to prevent the motor member from shaking due to a reaction exerted by the driven gear when the rotary unit is in rotation.

The prior art apparatus described above, however, has the following problem left unsolved. The motor position restricting member supports the motor case of the motor member in such a manner as to prevent it from being displaced. As a result, vibration ascribable to motor rotation is transferred to the apparatus body via the motor position restricting member. Particularly, in a high speed, color image forming apparatus, the motor position restricting member transfers, depending on its position, motor vibration to the apparatus body at such a timing that motor rotation and the writing of a latent image on an image carrier overlap. This degrades image quality to a critical degree.

Technologies relating to the present invention are also disclosed in, e.g., Japanese patent laid-open publication Nos. 11-295961 and 2000-235292.

SUMMARY OF THE INVENTION

It is therefore an object of the present invention to provide an image forming apparatus capable of enhancing the durability of a vibration preventing member against aging and protecting a rotary unit from defective rotation ascribable to damage to the vibration preventing member to thereby insure stable images.

In accordance with the present invention, an image forming apparatus includes an apparatus body and a rotary unit rotatable relative to the apparatus body. A drive unit causes the rotary unit to rotate to and stop at a preselected position. The drive unit includes a motor member and a vibration preventing member intervening between the motor case mounting surface of the motor member, which is substantially perpendicular to the axis of the motor member, and the apparatus body. The motor member is mounted on the vibration preventing member. A motor support member supports the weight of the motor member on a motor case surface substantially parallel to the axis of the motor member.

Also, in accordance with the present invention, an image forming apparatus includes an apparatus body and an image carrier for forming a latent image thereon. A writing unit writes the latent image on the image carrier. A rotary unit is rotatable relative to the apparatus body. A drive unit causes the rotary unit to rotate to and stop at a preselected position. The drive unit includes a motor member and a vibration preventing member intervening between the motor case mounting surface of the motor member, which is substantially perpendicular to the axis of the motor member, and the apparatus body. The motor member is mounted on the vibration preventing member. A motor position restricting member contacts or adjoins a motor case surface substantially parallel to the axis of the motor member. The motor position restricting member is so positioned as to obstruct the displacement of a motor case ascribable to a force exerted by the rotary unit on the motor member when the drive unit is driving the rotary unit, but when the writing unit does not write a latent image on the image carrier.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1A:
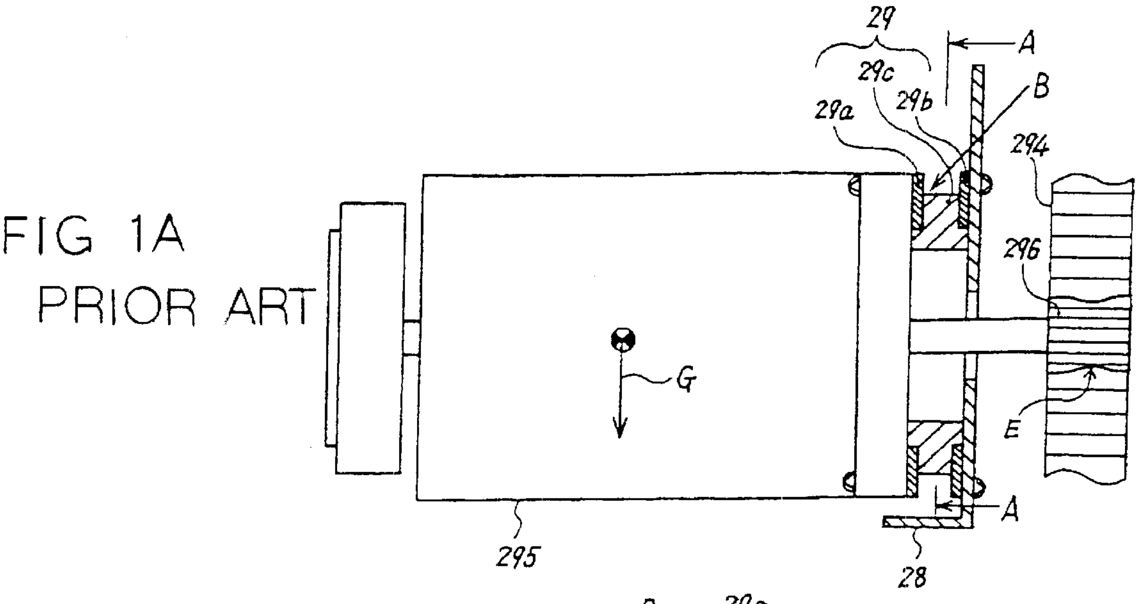
FIG 1A PRIOR ART
FIG. 1A is a side elevation showing damage to a motor mount.

To better understand the present invention, brief reference will be made to a conventional image forming apparatus including a developing unit implemented as a motor-driven revolver, shown in FIGS. 1A through 1C and FIG. 2. As shown in FIG. 1A, a motor mount 29 is made up of a pair of metal plates 29*a* and 29*b* and an annular rubber member or vibration preventing member 29*c* intervening between the plates 29*a* and 29*b*. The motor mount 29 may be implemented as a molding produced by positioning the metal plates 29*a* and 29*b* in a mold, injecting liquid rubber into the mold, and then curing the rubber. A revolver motor 295 is fastened to one metal plate 29*a* by screws. The other metal plate 29*b* is fastened to a motor bracket 28 mounted on the apparatus body by screws. The revolver motor 295 is therefore mounted on the apparatus body via the motor mount 29. A revolver motor gear 296 is held in mesh with a revolver gear 294 mounted on the revolver to thereby cause the revolver to rotate.

Figure 1B:
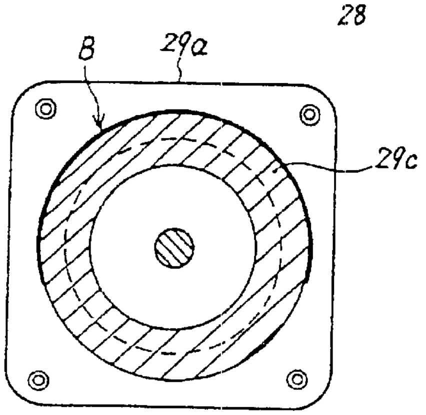
FIG. 1B PRIOR ART
FIG. 1B is a section as seen in a direction A shown in FIG. 1A.
Figure 1C:
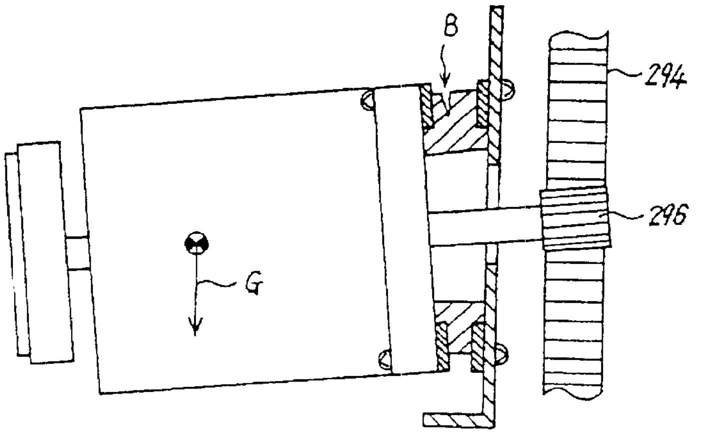
FIG. 1C PRIOR ART
FIG. 1C is a view demonstrating how a revolver motor drops due to its own weight when the motor mount is damaged.

Why the conventional motor mount 29 is damaged due to aging will be described with reference to FIGS. 1B and 1C. As shown in FIG. 1B, a crack B indicated by a thick line starts extending from the upper portion of the rubber member 29*c* toward the intermediate portion around a position where the metal plate 29*a* and rubber member 29*c* are adhered to each other. As a result, as shown in FIG. 1C, the end of the revolver motor 295 opposite to the end where the revolver motor gear 296 is positioned drops due to its own weight G.

Figure 2:
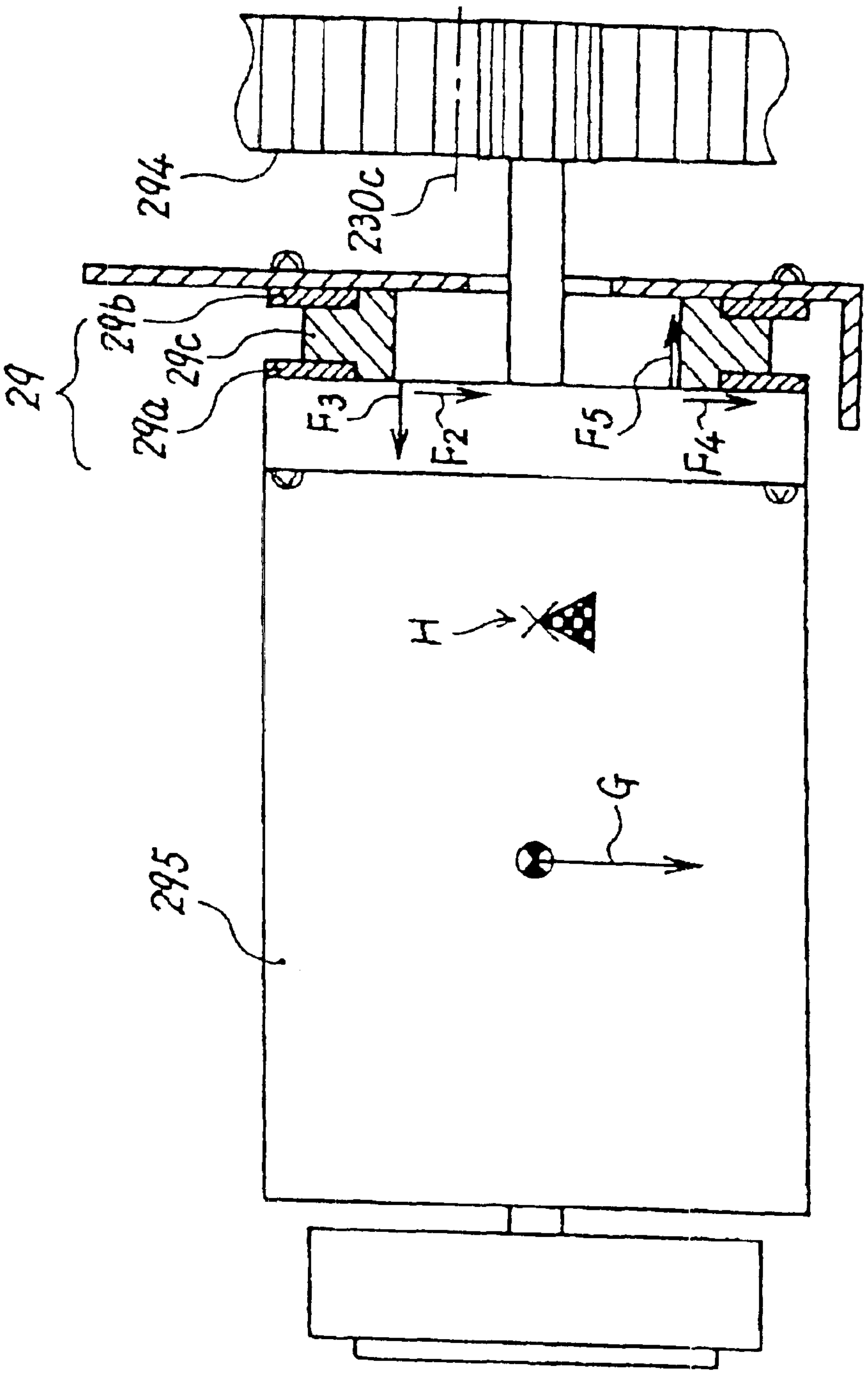
FIG. 2 PRIOR ART
FIG. 2 is a side elevation showing how the weight of the revolver motor acts on the motor mount.

In an image forming apparatus of the type rotating a large sized revolver at high speed, the revolver motor 295 needs great power and therefore increases in size and weight, as stated earlier. As shown in FIG. 2, the weight G of the revolver motor 295, which is positioned parallel to the axis 230*c* of the revolver, constantly acts on the rubber member 29*c* of the motor mount 29. The weight G acts as a moment about the apparent center of rotation H of the revolver motor 295. A shearing force $F_2$ parallel to the metal plate 29*a* and a tensile force $F_3$ tending to increase the distance between the metal plates 29*a* and 29*b* act on the upper portion of the motor mount 29. At the same time, a shearing force $F_4$ parallel to the metal plate 29*a* and a compressive force $F_5$ tending to reduce the distance between the metal plates 29*a* and 29*b* act on the lower portion of the motor mount 29.

Further, loads ascribable to the repeated acceleration and deceleration of the revolver act on the motor mount 29. Such loads, coupled with the load ascribable to the weight of the revolver motor 295, cause the crack B to appear in the motor mount 29 due to aging. When the moment of inertia of the revolver is great, the loads ascribable to repeated acceleration and deceleration are heavy. Rubber, in particular, is lower in tensile strength than in compressive strength. A crack therefore rapidly extends deep into the rubber member 29*c* when the rubber member 29*c* is pulled by the loads. This is why the crack starts at the upper portion of the rubber member 29*c*, as shown in FIG. 1C.

Figure 8:
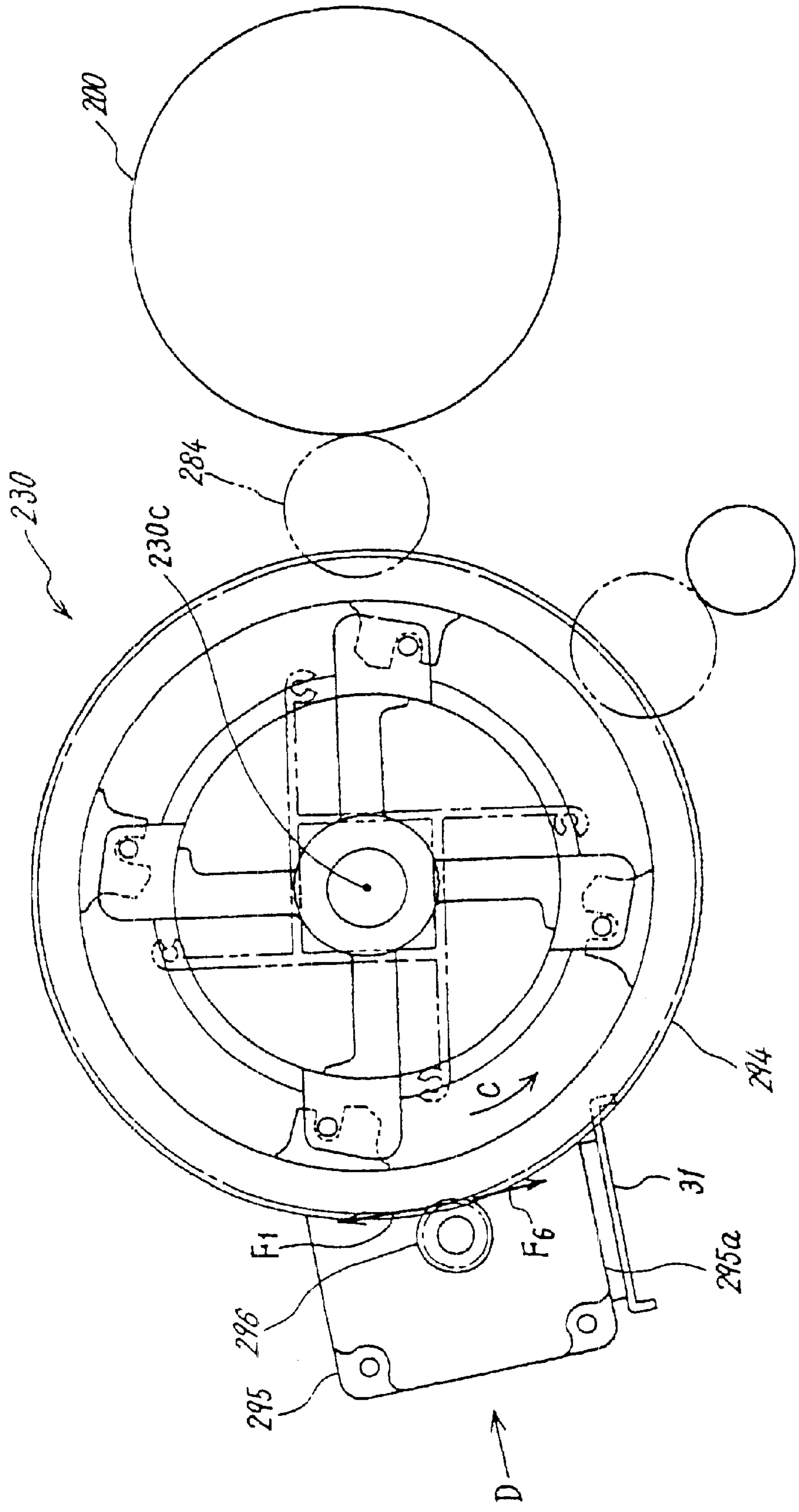
FIG. 8 is a front view showing a system also included in the illustrative embodiment for driving the revolver.

As shown in FIG. 8, assume that the revolver motor gear 296 causes the revolver gear 294 to rotate in a direction indicated by an arrow C. Then, the crack B prevents the motor shaft from being held at a preselected position against a reactive force $F_1$ exerted by the revolver gear 294 while the revolver is in rotation. As a result, the revolver motor gear 296 and revolver gear 294 are brought out of accurate mesh with each other, preventing the revolver from stopping at a preselected position. Further, as shown in FIG. 1A, the defective mesh of the gears 294 and 296 ascribable to the displacement of the motor shaft causes local wear E to occur on the teeth of the gear 296. The local wear E occurs before the defective stop of the revolver ascribable to aging and thereby reduces a margin as to the failure of accurate meshing.

To solve the problems discussed above, the rubber hardness or the area of the rubber member 29*c* may be increased to increase strength. However, rubber hardness available is limited due to the fluidity of rubber at the time of molding. Moreover, increasing the strength of the rubber member 29*c* degrades the function originally assigned to the motor mount, i.e., intercepting motor vibration. The above problems are also true with any other rotary unit.

Figure 3:
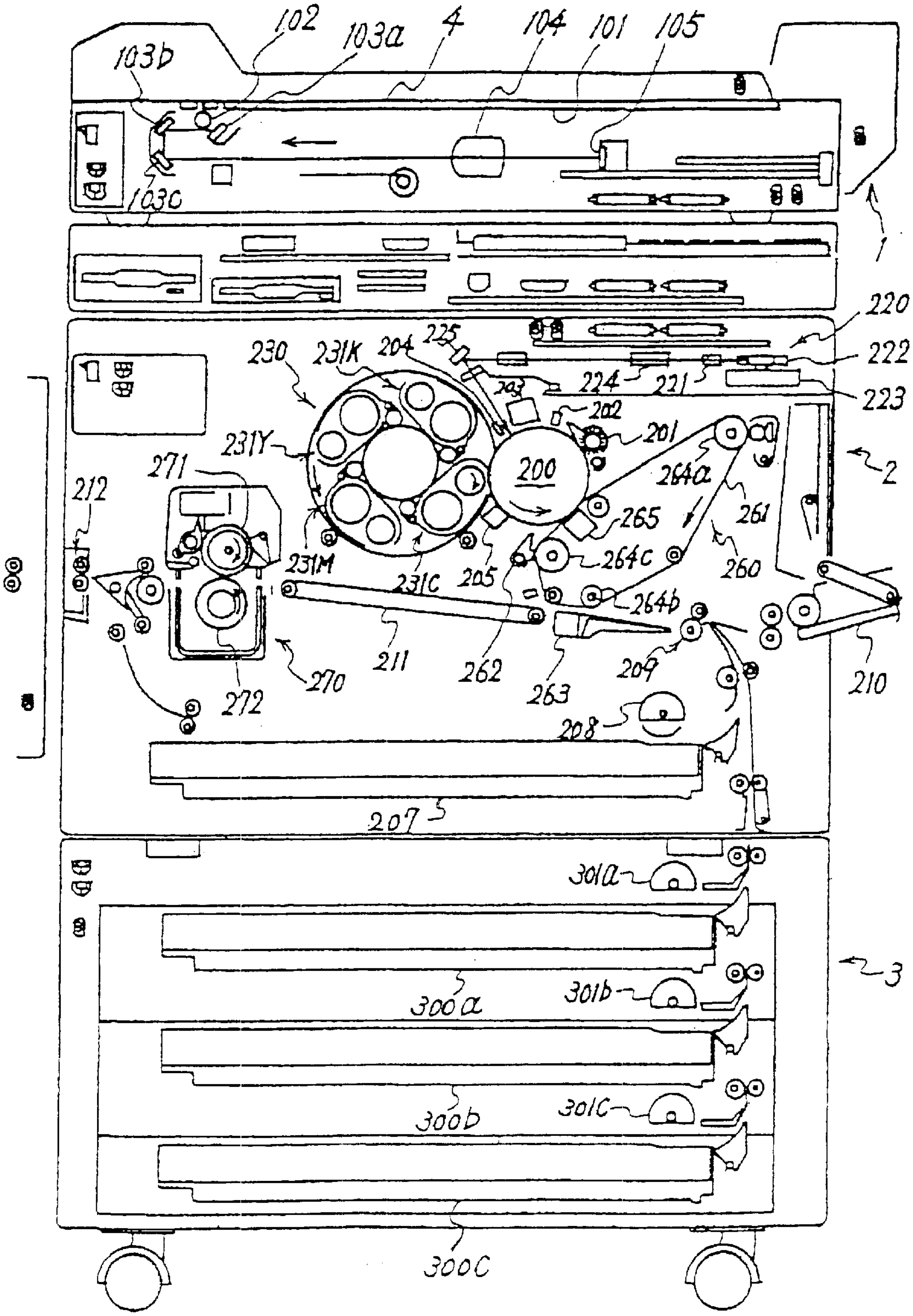
FIG. 3 is a front view of an image forming apparatus embodying the present invention.

Referring to FIG. 3 of the drawings, an image forming apparatus embodying the present invention is shown and implemented as an electrophotographic color copier by way of example. As shown, the color copier is generally made up of a color scanner or color image reading device 1, a color printer or color image recording device 2, a sheet bank 3, and a control system that will be described later.

The color scanner 1 includes a lamp 102 for illuminating a document 4 laid on a glass platen 101. The resulting reflection from the document 4 is incident to a color image sensor 105 via mirrors 103*a*, 103*b* and 103*c* and a lens 104. The color image sensor 105 reads color image information incident thereto color by color, e.g., red (R), green (G) and blue (B) image information while converting each of them to an electric signal. In the illustrative embodiment, the color image sensor 105 includes R, G and B color separating means and a CCD (Charge Coupled Device) array or similar photoelectric transducer. An image processing section, not shown, transforms the resulting R, G and B image signals to black (Bk), cyan (C), magenta (M) and yellow (Y) color image data in accordance with the intensity of the signal.

More specifically, in response to a scanner start signal synchronous to the operation of the color printer 2, which will be described later, the optics including the lamp 102 and mirrors 103*a* through 103*c* scans the document 4 in a direction indicated by an arrow in FIG. 1. The color scanner 1 outputs image data of one color every time it scans the document 4, i.e., outputs image data of four different colors by scanning the document 4 four consecutive times. The color printer 2 sequentially forms Bk, C, M and Y toner images while superposing them on each other, thereby completing a four-color or full-color toner image.

The color printer 2 includes a photoconductive drum or image carrier 200, an optical writing unit 220 and a revolver or developing device 230. The color printer 2 further includes an intermediate image transferring unit 260 and a fixing unit 270. The drum 200 is rotatable counterclockwise, as indicated by an arrow in FIG. 1. Arranged around the drum 200 are a drum cleaner 201, a discharge lamp 202, a charger 203, a potential sensor or charged potential sensing means 204, one of developing sections of the revolver 230 selected, a density pattern sensor 205, and a belt 261 included in the intermediate image transferring unit 260.

The optical writing unit 220 converts the color image data output from the color scanner 1 to a corresponding optical signal and scans the surface of the drum 4 in accordance with the optical signal. As a result, a latent image is electrostatically formed on the drum 200. The optical writing unit 220 includes a semiconductor laser or light source 221, a laser driver, not shown, a polygonal mirror 222, a motor 223 for driving the mirror 222, an f/θ lens 224, and a mirror 225.

The revolver 230 includes a Bk developing section 231K, a C developing section 231C, a M developing section 231M, a Y developing section 231Y, and a drive arrangement for causing the revolver 230 to bodily rotate counterclockwise, as indicated by an arrow in FIG. 1. The developing sections 231K through 231Y each include a developing sleeve and a paddle or agitator. The developing sleeve rotates with a developer forming a magnet brush thereon and contacting the surface of the drum 200 to thereby develop the latent image. The paddle scoops up the developer to the developing sleeve while agitating it. In the illustrative embodiment, the developer stored in each developing section is a toner and carrier mixture, i.e., a two-ingredient type developer. The toner is charged to negative polarity by being agitated together with the carrier. A bias power supply or bias applying means applies a bias for development to the developing sleeve. Consequently, the developing sleeve biases a metallic core layer included in the drum 200 to a preselected potential. In the illustrative embodiment, the above bias is implemented by a negative DC voltage Vdc biased by an AC voltage Vac.

While the color copier is in a standby state, the revolver 230 remains stationary with the Bk developing unit 231K facing the drum 200 at a developing position. On the start of a copying operation, the color scanner 1 starts reading Bk color image information at a preselected timing. A laser beam issuing from the semiconductor laser 221 starts forming a Bk latent image in accordance with Bk color image data derived from the Bk color image information. The Bk developing sleeve included in the Bk developing unit 231K starts rotating before the leading edge of the Bk latent image arrives at the developing position. As a result, Bk latent image is developed by Bk toner from the leading edge to the trailing edge. As soon as the trailing edge of the Bk latent image moves away from the developing position, the revolver 230 bodily rotates to bring the next developing section to the developing position. This rotation completes at least before the leading edge of the next latent image arrives at the developing position. The configuration and operation of the revolver 230 will be described more specifically later.

The intermediate image transferring unit 260 includes a belt cleaner 262, a corona discharger 263 and a belt transfer unit 265 in addition to the previously mentioned belt 261. The belt 261 is passed over a drive roller 264*a*, a roller 264*b* located at an image transferring position, a roller 264*c* located at a cleaning position, and driven rollers. A motor, not shown, causes the belt 261 to turn. The belt cleaner 262 includes an inlet seal, a rubber blade, a discharge coil, and a mechanism for moving the inlet seal and rubber blade, although not shown specifically. While the transfer of images of the second to fourth colors from the drum 200 to the belt 261 is under way after the transfer of the image of the first color or Bk, the above mechanism maintains the inlet seal and rubber blade spaced from the belt 261. A DC voltage or an AC biased DC voltage is applied to the corona discharger 263. The corona discharger 263 collectively transfers the full-color image completed on the belt 261 to a paper sheet or similar recording medium.

The color printer 2 includes a sheet cassette 207 in addition to the sheet bank 3, which includes sheet cassettes 300*a*, 300*b* and 300*c*. The sheet cassettes 207 and 300*a* through 300*c* each are loaded with a stack of paper sheets of a particular size. Pickup rollers 208 and 301*a*, 301*b* and 301*c* are respectively associated with the sheet cassettes 207 and 300*a*, 300*b* and 300*c*. One of the pickup rollers 208 through 301*c* pays out the sheets from associated one of the sheet cassettes 207 through 300*c* selected toward a registration roller pair 209. A manual feed tray 210 is available for feeding OHP (OverHead Projector) sheets, thick sheets and other special sheets by hand.

In operation, on the start of an image forming cycle, the drum 200 rotates counterclockwise while the belt 261 turns counterclockwise by being driven by the previously mentioned motor. In this condition, a Bk, a C, a M and a Y toner image are sequentially transferred from the drum 200 to the belt 261 one above the other, completing a full-color image.

More specifically, the charger 203 uniformly charges the surface of the drum 200 to a negative potential of about −700 V by corona discharge. The semiconductor laser 221 scans the charged surface of the drum 200 by raster scanning in accordance with a Bk color image signal. As a result, the charge of the drum 200 is lost in the scanned portion in proportion to the quantity of incident light, forming a Bk latent image. Bk toner charged to negative polarity and forming a magnet brush on the Bk developing sleeve contacts the Bk latent image. At this instant, the Bk toner deposits only on the scanned portion of the drum 200 where the charge is lost, thereby forming a Bk toner image. An image transferring device 265 transfers the Bk toner image from the drum 200 to the belt 261, which is turning in contact with and at the same speed as the drum 200. Let the image transfer from the drum 200 to the belt 261 be referred to as primary image transfer.

The drum cleaner 201 removes some Bk toner left on the drum 200 after the primary image transfer to thereby prepare the drum 200 for the next image formation. The toner removed by the drum cleaner 201 is collected in a waste toner tank via a piping, although not shown specifically.

The color scanner 1 starts reading C image data at a preselected timing. A C latent image is formed on the drum 200 in accordance with the C image data. After the trailing edge of the Bk latent image has moved away from the developing position, but before the leading edge of the C latent image arrives at the developing position, the revolver 230 rotates to bring the C developing section 231C to the developing position. The C developing section 231C develops the C latent image with C toner for thereby producing a corresponding C toner image. After the trailing edge of the C latent image has moved away from the developing position, the revolver 230 again rotates to bring the M developing section 231M to the developing position. This rotation also completes before the leading edge of the next or M latent image arrives at the developing position.

The formation of a M toner image and a Y toner image will not be described specifically because it is similar to the formation of the Bk and C toner images described above.

By the above procedure, the Bk, C, M and Y toner images are sequentially transferred from the drum 200 to the belt 261 one above the other. The corona discharger 263 collectively transfers the resulting full-color toner image from the belt 261 to a paper sheet. The transfer of the full-color toner image from the belt 261 to the paper sheet will be referred to as secondary image transfer hereinafter.

More specifically, the paper sheet is fed from any one of the sheet cassettes 207 and 300*a* through 300*c* or the manual feed tray 210 and once stopped by the registration roller pair 209. The registration roller pair 209 drives the paper sheet at such a timing that the leading edge of the paper sheet meets the trailing edge of the full-color toner image formed on the belt 261. The corona discharger 263 charges the paper sheet, which is superposed on the full-color toner image, to positive polarity. As a result, the toner image is almost entirely transferred from the belt 261 to the paper sheet. A discharger, not shown, located at the left-hand-side of the corona discharger 263 discharges the paper sheet by AC+DC corona discharge, so that the paper sheet is separated from the belt 261. The paper sheet is then transferred to a conveyor 211 implemented as a belt.

The conveyor 211 conveys the paper sheet carrying the toner image thereon to the fixing unit 270. In the fixing unit 270, a heat roller 271 and a press roller 272 cooperate to fix the toner image on the paper sheet with heat and pressure. The paper sheet or full-color copy coming out of the fixing unit 270 is driven out to a copy tray, not shown, face up.

After the secondary image transfer, the drum cleaner 201, which may be implemented as a brush roller or a rubber blade, cleans the surface of the drum 200. Subsequently, the discharge lamp 202 uniformly discharges the surface of the drum 200. At the same time, the inlet seal and rubber blade of the belt cleaner 262 are again pressed against the belt 261 to thereby clean the surface of the belt 261.

Figure 4:
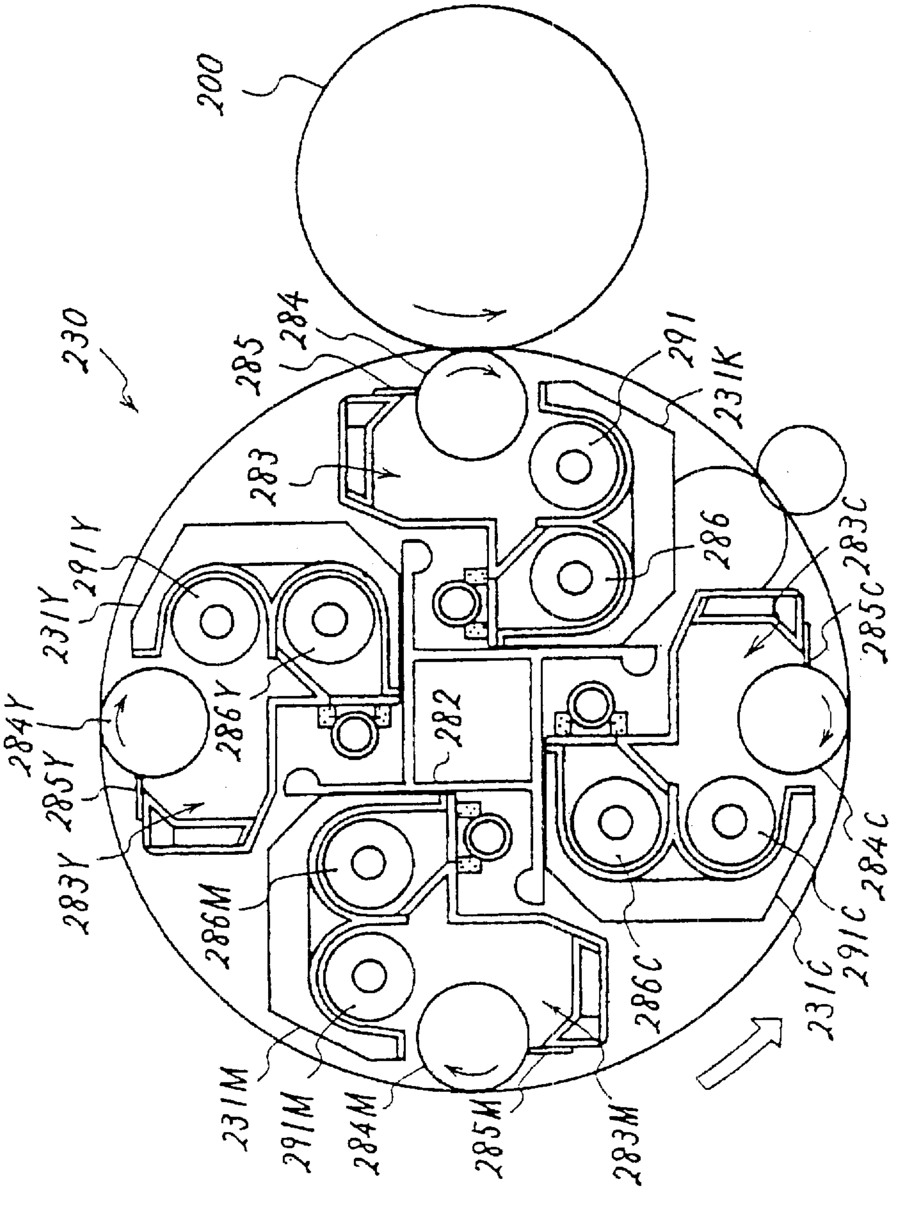
FIG. 4 is a section showing a revolver included in the illustrative embodiment.
Figure 5:
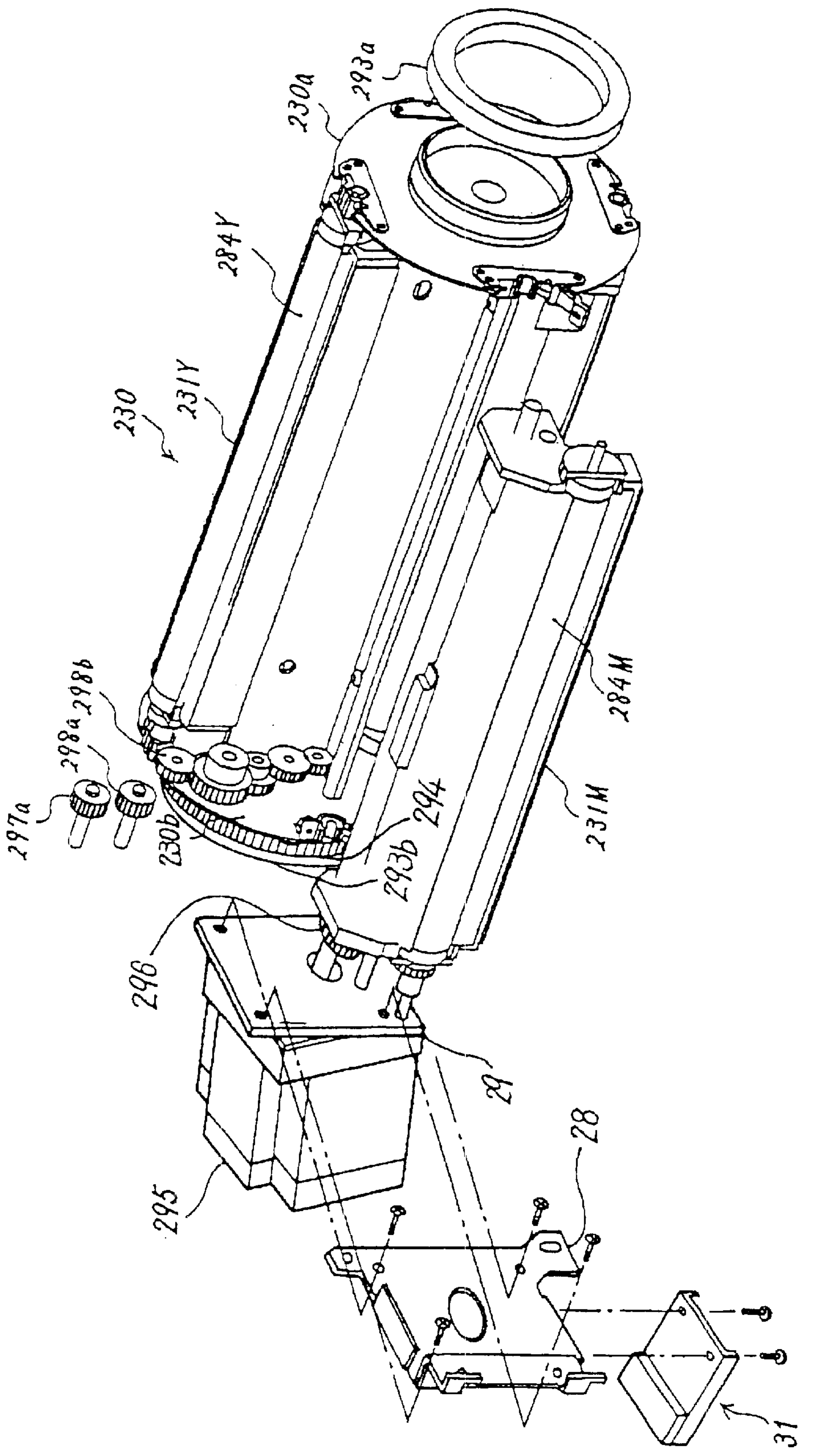
FIG. 5 is an isometric view showing the revolver.

Reference will be made to FIGS. 4 and 5 for describing the revolver 230 in detail. As shown, the revolver 230 includes the developing sections 231K through 231Y. The developing sections 231K through 231Y are supported by a stay 282 extending between a front end wall 230*a* and a rear end wall 230*b*, which are implemented as disks. The developing sections 231K through 231Y include identical casing portions 283K, 283C, 283M and 283Y, respectively. The casing portions 283K through 283Y each store a two-ingredient type developer, i.e., toner and carrier mixture of a particular color. In the specific position shown in FIG. 4, the developing section 231K, which stores a black toner and carrier mixture, is located at the developing position. This developing section 231K is followed by the developing sections 231Y, 231M and 231C in the counterclockwise direction.

The following description will concentrate on the black developing section 231K located at the developing position by way of example. In FIG. 4, the yellow, magenta and cyan developing sections 231Y, 231M and 231C are simply distinguished from the black developing section 231K by suffixes Y, M and C.

In the Bk developing section 231K, the casing portion 283 is formed with an opening facing the drum 200. A developing roller or developer carrier 284 is made up of the developing sleeve and a magnet roller disposed in the developing sleeve. A doctor blade or metering member 285 regulates the amount of the developer deposited on and conveyed by the developing roller 84 to the developing position. A first screw conveyor 286 conveys part of the developer removed by the doctor blade 285 from the rear to the front in the axial direction perpendicular to the sheet surface of FIG. 4. A second screw conveyor 291 conveys the developer in the opposite direction to the upper screw conveyor 286. A toner content sensor, not shown, is positioned in the casing portion 283 below the second screw conveyor 291 for sensing the toner content of the developer stored in the casing portion 283.

Figure 6:
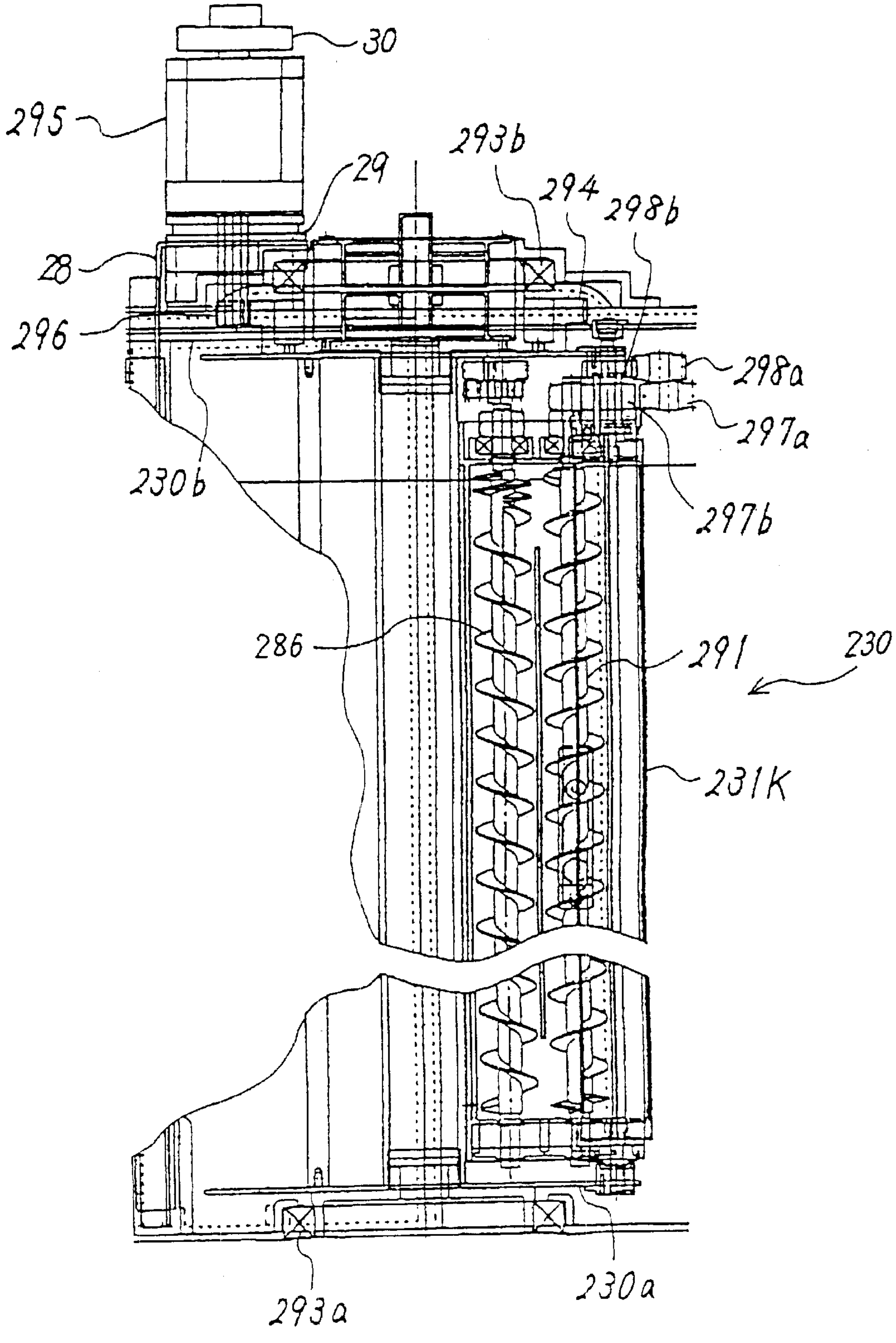
FIG. 6 is a fragmentary plan view of the revolver.

FIG. 6 is a section in a plane containing the axes of the first and second screw conveyors 286 and 291. As shown, the screw conveyors 286 and 291 each rotate in a particular direction for circulating the developer in the casing portion 283 while agitating it. The developer is deposited on the sleeve of the developing roller 284 and conveyed thereby to the developing position via the doctor blade 285. At the developing position, the toner of the developer is fed to the drum 200.

As shown in FIGS. 5 and 6, revolver support bearings 293*a* are mounted to the front and rear end walls 230*a* and 230*b* of the revolver 230 to thereby rotatably support the revolver 230. A revolver gear 294 is mounted on the rear end plate 230*b*. A revolver motor gear 296 is mounted on the output shaft of a revolver motor 295 and held in mesh with the revolver gear 294. In this configuration, the revolver motor 295 causes the revolver 230 to rotate until necessary one of the developing sections 231K through 213C arrives at the developing position. When any one of the developing sections 231K through 231C is located at the developing position, idler gears 297*b* and 298*b* mounted on the developing unit are respectively brought into mesh with drive gears 297*a* and 298*a*, which are respectively assigned to development and toner replenishment. FIG. 5 additionally shows how a motor mount 29 and a motor support member 31 are fastened to a motor bracket 28 by screws.

Figure 7:
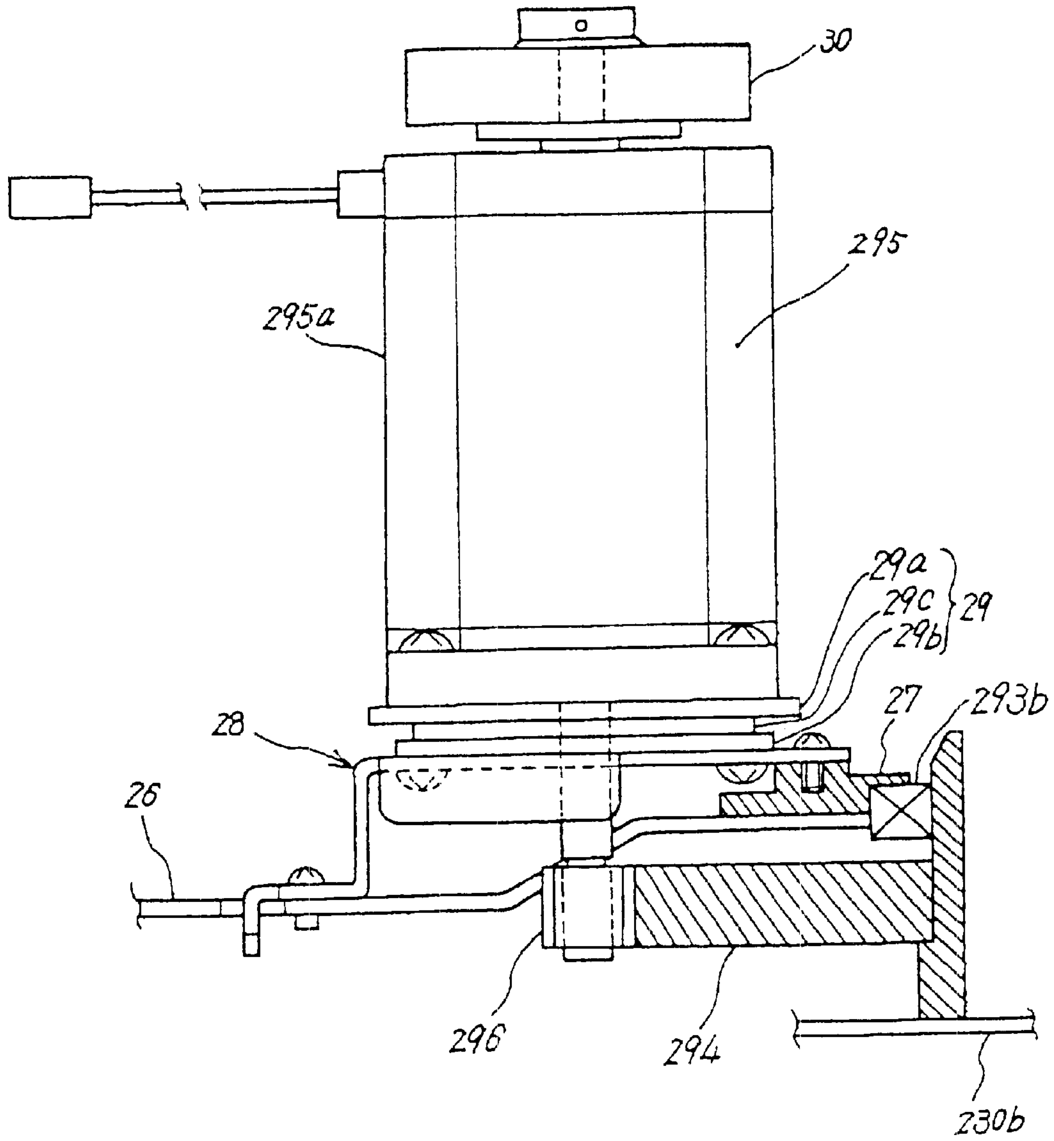
FIG. 7 is a view showing a revolver motor included in the illustrative embodiment together with members associated therewith.

An arrangement unique to the illustrative embodiment for enhancing the durability of the motor mount 29 will be described hereinafter. As shown in FIG. 7, the revolver support bearing 293*b* is press fitted in a bearing holder 27. The motor bracket 28 is fastened to the bearing holder 27 and a rear side wall included in the copier body by screws. The revolver motor 295 is mounted on the motor bracket 28 with the intermediary of the motor mount 29. A damper or vibration preventing member 30 is mounted on the rear end of the output shaft of the revolver motor 295 for reducing vibration and enhancing high-speed operation.

The motor mount 29 is implemented as a molding made up of a pair of metal plates 29*a* and 29*b* and an annular rubber member 29*c* sandwiched between the plates 29*a* and 29*b*. The metal plates 29*a* and 29*b* are formed with tapped holes for mounting. The motor mount 29 prevents the vibration of the revolver motor 295 from being transferred to the copier body.

Figure 9A:
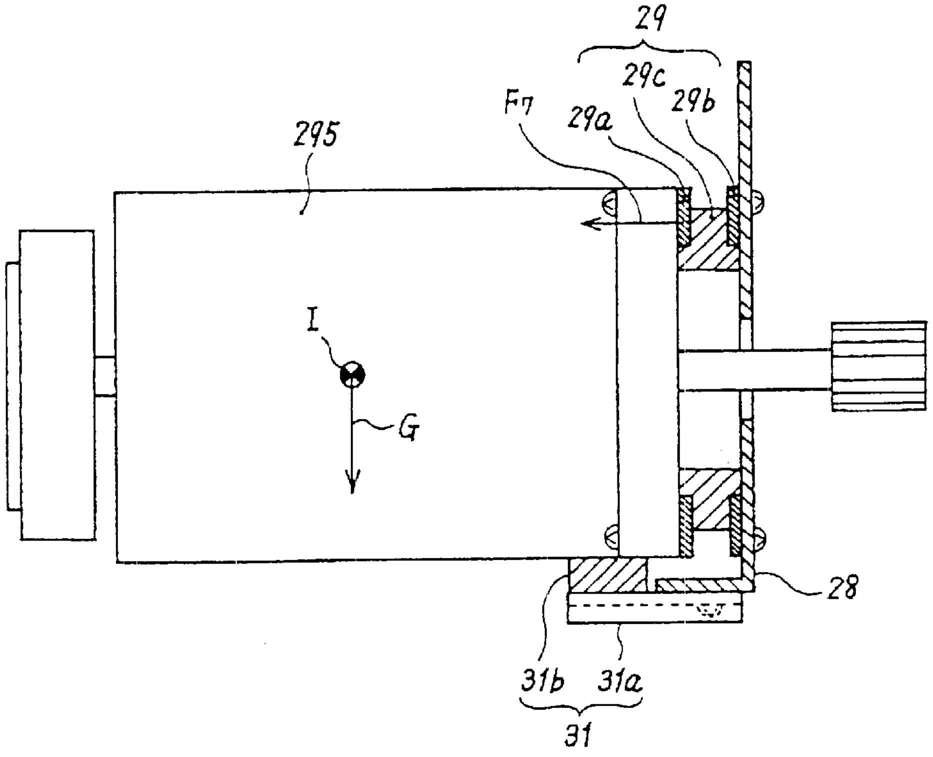
FIG. 9A is a view as seen in a direction A shown in FIG. 8, showing a specific configuration of a motor support member.

As shown in FIG. 8, the revolver motor 295 is positioned at substantially the opposite side to the developing position between the developing roller 284 and the drum 200 with respect to the axis 230*c* of the revolver 230. The revolver motor 295 includes a motor case 295*a*. A motor support member 31 contacts the surface of the motor case 295*a* that faces substantially downward. As shown in FIG. 9A, the motor support member 31 is made up of a bracket 31*a* fastened to the motor bracket 28 by screws and a rubber member 31*b* adhered to the end of the bracket 31*a*. A moment or load $F_7$ has heretofore constantly acted on the rubber member 29*c* of the motor mount 29 due to the weight G of the revolver motor 295. The motor support member 31 acts in a direction in which it cancels the moment $F_7$. This successfully scatters the moment or load $F_7$ ascribable to the weight G of the revolver motor 295 and thereby enhances the durability of the motor mount 29.

Figure 9B:
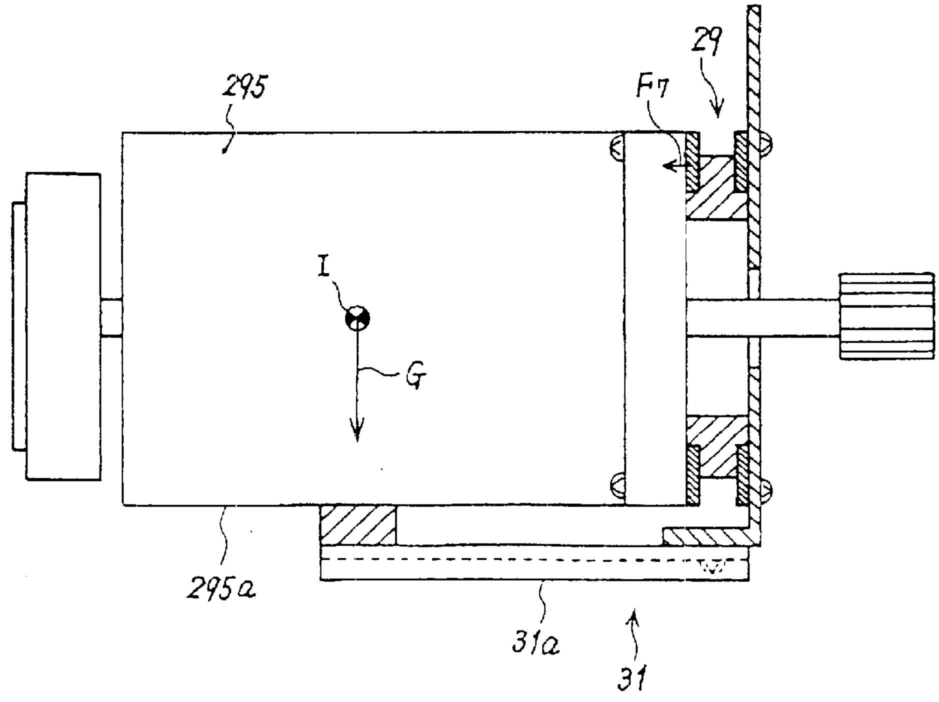
FIG. 9B is a view similar to FIG. 9A, showing another specific configuration of the motor support member.

In the configuration shown in FIG. 9A, the motor support member 31 supports the revolver motor 295 at a position close to the motor mount 29. Such a support position suffices to scatter the load ascribable to the weight G of the revolver motor 295 and to enhance the durability of the motor mount 29. However, to reduce the moment $F_7$ acting on the motor mount 29 as far as possible, the support position should preferably be as close to the center of gravity I of the revolver motor 295 as possible. Specifically, as shown in FIG. 9B, the support bracket 31*a* may be extended in such a manner as to support the motor case 295 at a position beneath the center of gravity I of the revolver motor 295. With this configuration, the motor support member 31 reduces the load (moment $F_7$) acting on the motor mount 29 to almost zero and thereby further enhances the durability of the motor mount 29.

An alternative embodiment of the image forming apparatus in accordance with the present invention will be described hereinafter. The previous embodiment bears the weight G of the revolver motor 295 to thereby reduce the moment $F_7$ acting on the motor mount 29. In practice, however, a load ascribable to the rotation of the revolver 230 acts on the motor mount 29 in addition to the weight G of the revolver motor 295. Specifically, assume that the revolver motor 295 is driven to rotate the revolver 230 in a direction C shown in FIG. 8. Then, the revolver gear or driven member 294 for causing the revolver 230 to rotate exerts a reactive force on the revolver motor gear 296, which is mounted on the output shaft of the revolver motor 295. For example, when the revolver 230 in rotation is decelerated, a reactive force $F_6$ acts on the revolver motor gear 296 downward and causes the revolver motor 295 to move. As a result, the revolver motor 295 is displaced.

Figure 10:
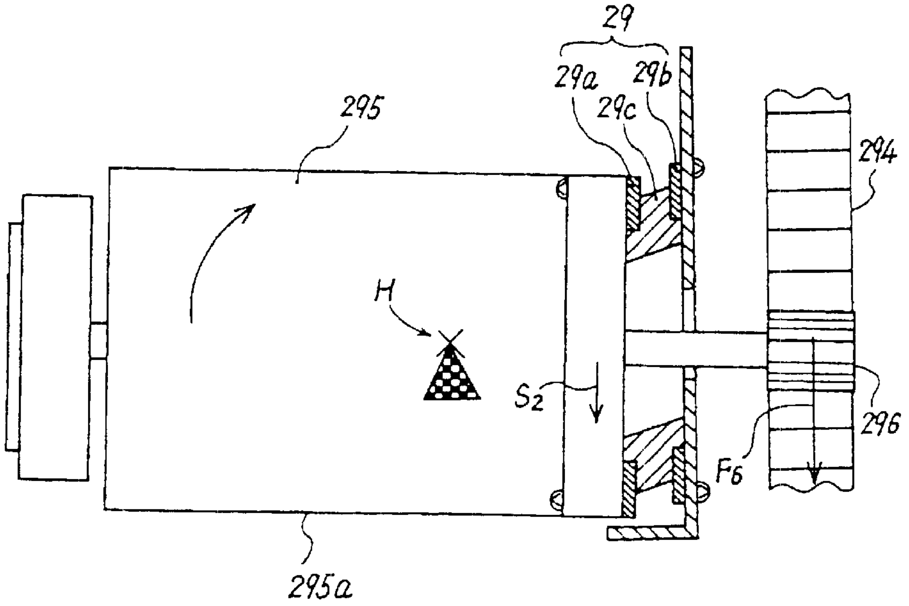
FIG. 10 is a view demonstrating how the revolver motor is displaced by a revolver gear when the revolver is decelerated.

FIG. 10 demonstrates how the revolver motor 295 is displaced via the revolver gear 294 at the time of deceleration. As shown, the reactive force $F_6$ acting on the revolver motor gear 296 downward causes the rubber member 29*c* of the motor mount 29 to elastically deform. As a result, the metal plate 29*a* is displaced in the direction of compression (rightward in FIG. 10) at its upper portion and in the direction of tension (leftward in FIG. 10) at its lower end. In addition, the lower portion of the metallic plate 29*a* is displaced in the direction of shearing $S_2$, i.e., pulled downward. The revolver motor 295 is therefore apparently displaced about a center of rotation H remote from the motor case mounting surface (shaking). The shaking of the revolver motor 295 exerts a load on the motor mount 29 and is likely to damage the motor mount 29.

In light of the above, the illustrative embodiment additionally includes a motor position restricting member for preventing the revolver motor 295 from shaking. The motor position restricting member contacts or adjoins the motor case 295*a*. However, the motor position restricting member is likely to transfer, depending on its position, the vibration of the revolver motor 295 to the copier body and adversely effect image formation.

To implement high speed, color image formation, a high process speed is a prerequisite. Another prerequisite is that the rotation speed of the revolver be increased to reduce a color switching time. In practice, however, a decrease in torque is unavoidable in a high rotation speed range due to the characteristic of the revolver motor, reducing a margin as to the failure of meshing. Further, an increase in torque relying on an increase in motor current is limited from the power consumption and heat generation standpoint. The color switching time therefore cannot be reduced beyond a certain limit.

As for the influence of the vibration of the revolver motor on images, an image should preferably be written on the drum when the revolver motor is not driven. However, a certain period of time is necessary for the drum to move from the writing position to the developing position for layout reasons and in order to guarantee the stabilization of optical attenuation after exposure. That is, high-speed image formation is difficult to practice with a system of the type starting writing an image after stopping the revolver motor for switching the color. A color image can be formed at high speed if a latent image is formed on the drum while the revolver is in rotation.

Figure 11:
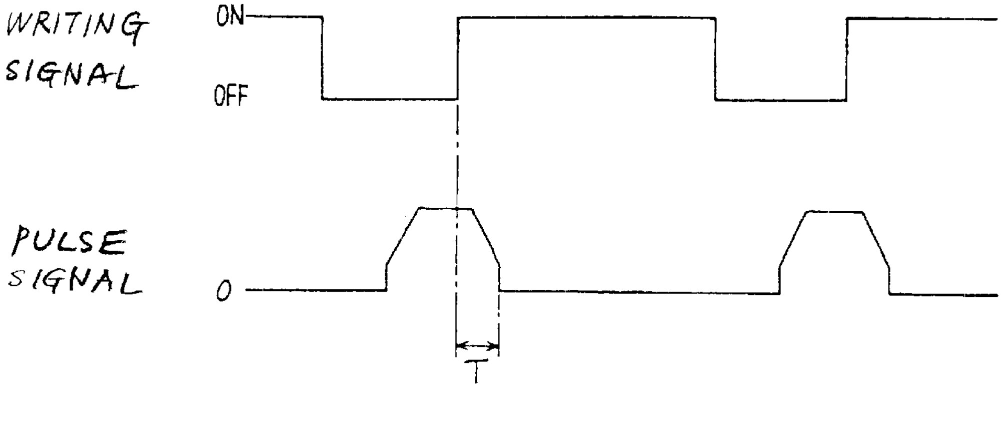
FIG. 11 is a timing chart showing a specific relation between a writing signal for writing a latent image on a photoconductive drum and the number of pulses fed to the revolver motor.

FIG. 11 is a timing chart showing a specific relation between a writing signal for writing a latent image on the drum and the number of pulses fed to the revolver motor (drive timing). As shown, the writing operation and the drive of the revolver motor overlap over a period of time T. The revolver is decelerated during the period of time T and then brought to a stop just before the leading edge of a latent image arrives at the developing position.

Figure 12A:
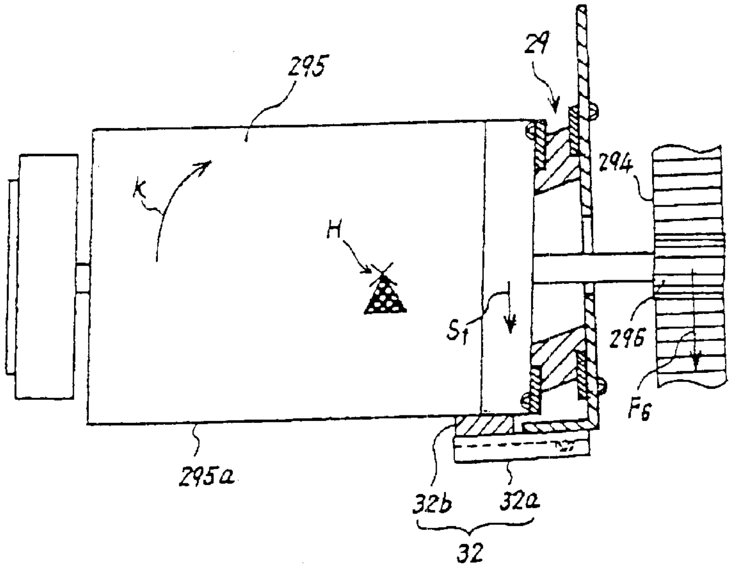
FIG. 12A is a view showing a specific configuration of a motor position restricting member representative of an alternative embodiment of the present invention.

FIG. 12A shows a specific configuration in which a motor position restricting member 32 is located in the vicinity of the motor mount 29. As shown, the reactive force $F_6$ acts on the revolver motor gear 296 when the revolver is decelerated. The motor position restricting member 32 is made up of a bracket 32*a* and a rubber piece 32*b* adhered to the end of the bracket 32*a*. The restricting member 32 contacts or adjoins the surface of the motor case 295*a* at a position where it obstructs the displacement of the revolver motor 295 in the event of deceleration of the revolver. In this case, the writing operation is not performed while the revolver is in deceleration.

The reactive force $F_6$ acting on the revolver motor gear 296 causes the revolver motor 295 to rotate about an apparent center in a direction K. As a result, the side of the revolver motor 295 adjoining the motor mount 29 tends to move in a direction $S_1$. At this instant, the motor position regulating member 32 sustains the surface of the motor case 295*a* to thereby obstruct the displacement of the revolver motor 295. Further, when the revolver is decelerated, the teeth of the driven gear mounted on the revolver are likely to hit against the teeth of the drive gear mounted on the copier body, resulting in an impact load. The motor position restricting member 32 bears the impact load as well. In this manner, the restricting member 32 prevents the motor mount 29 from being repeatedly displaced. Because the writing operation is not performed while the revolver is in deceleration, an occurrence that the vibration of the revolver motor 295 is transferred to the copier body and effects the writing operation is obviated.

Figure 12B:
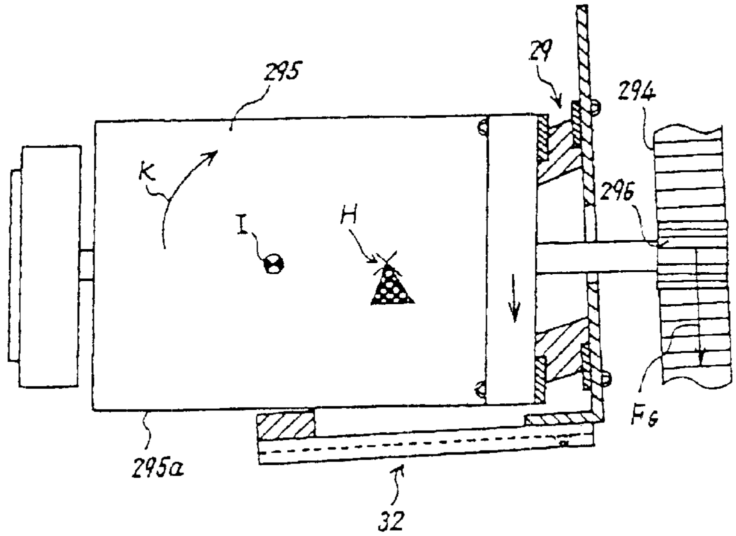
FIG. 12B is a view showing another specific configuration of the motor position restricting member.

Another specific configuration of the motor position restricting member 32 will be described on the assumption that the color copier writes a latent image at the timing shown in FIG. 11. As shown in FIG. 12B, the motor position regulating member 32 is positioned at the opposite side to the revolver motor gear 296 with respect to the apparent center of rotation H. Again, the reactive force $F_6$ causes the revolver motor 295 to rotate about the apparent center of rotation H in the direction K. As a result, the motor case 295*a* moves away from the restricting member 32. The restricting member 32 therefore has no influence or little influence with respect to vibration.

Figure 12C:
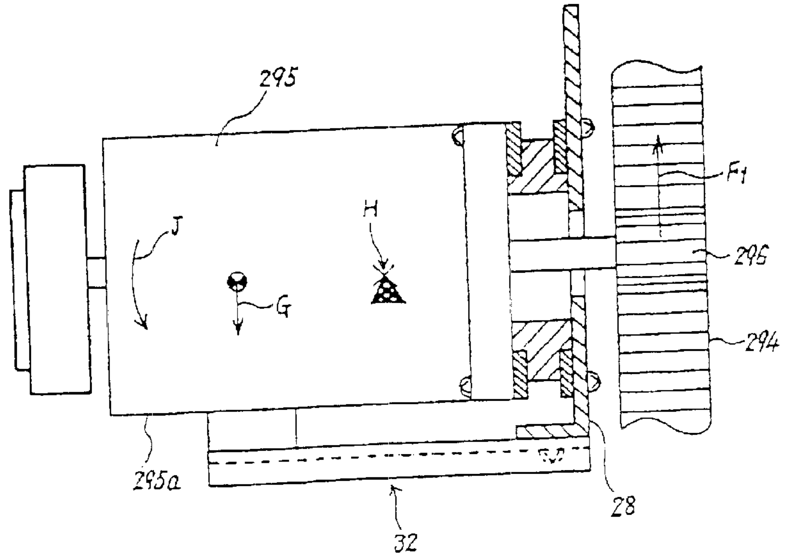
FIG. 12C is a view showing forces that act on a revolver motor gear and other members when the revolver is accelerated.

On the other hand, as shown in FIG. 12C, the acceleration of the revolver causes the revolver motor 295 to move in a direction J opposite to the direction K shown in FIG. 12B. More specifically, when the revolver is accelerated, the revolver gear 294 exerts a reactive force $F_1$ and causes the revolver motor 295 to rotate about the apparent center H in the direction J. The motor position restricting member 32 obstructs such a movement of the revolver motor 295. The restricting member 32 therefore reduces the load to act on the motor mount 29 and thereby enhances the durability of the motor mount 29. At this instant, the vibration of the revolver motor 295 is transferred to the copier body via the motor bracket 28. However, the vibration does not matter at all because the writing operation is not effected at this timing.

Moreover, in the condition shown in FIG. 12C, the motor position restricting member 32 bears the weight of the revolver motor 295 and, in this sense, plays the role of the motor support member of the previous embodiment at the same time. In this manner, the restricting member 32 reduces the load to act on the motor mount 29 during the acceleration of the revolver and the load to act on the same due to the weight G of the revolver motor 295, thereby enhancing the durability of the motor mount 29. In addition, when the revolver is decelerated, the vibration of the revolver motor 295 is not transferred or transferred little to the copier body via the restricting member 32 because the motor case 295*a* moves away from the restricting member 32. This reduces the influence of the motor vibration on the writing operation.

While the illustrative embodiments have concentrated on a developing unit, the present invention is applicable to any rotary unit that is driven by a motor and exerts a reactive force based on a certain degree of inertia.

In summary, it will be seen that the present invention provides an image forming apparatus having various unprecedented advantages, as enumerated below.

(1) A vibration preventing member for mounting a motor achieves enhanced durability against aging. A rotary unit is therefore protected from defective rotation ascribable to damage to the vibrating preventing member, insuring stable images.

(2) A motor position restricting member has no influence on the writing of a latent image on an image carrier and therefore insures high quality images.

(3) A motor member is free from displacement when the rotary unit is accelerated. This reduces the repeated displacement of the vibration preventing member. In addition, when the rotary unit is decelerated, the vibration of the motor member influences the writing operation little.

(4) The motor position restricting member bears the weight of the motor member. Therefore, a moment to constantly act on the vibration preventing member due to the weight of the motor member is reduced.

Various modifications will become possible for those skilled in the art after receiving the teachings of the present disclosure without departing from the scope thereof.

What is claimed is:

1. An image forming apparatus comprising:

an apparatus body;

a rotary unit rotatable relative to said apparatus body; and a drive unit for causing said rotary unit to rotate to and stop at a preselected position;

said drive unit comprising:

a motor member;

a vibration preventing member intervening between a motor case mounting surface of said motor member, which is substantially perpendicular to an axis of said motor member, and said apparatus body, said motor member being mounted on said vibration preventing member; and a motor support member for supporting a weight of said motor member on a motor case surface substantially parallel to the axis of said motor member.

2. The apparatus as claimed in claim 1, wherein said motor support member supports said motor case surface at a position substantially beneath a center of gravity of said motor member.

3. An image forming apparatus comprising:

an apparatus body;

an image carrier for forming a latent image thereon;

writing means for writing the latent image on said image carrier; and a rotary unit rotatable relative to said apparatus body;

a drive unit for causing said rotary unit to rotate to and stop at a preselected position;

said drive unit comprising:

a motor member;

a vibration preventing member intervening between a motor case mounting surface of said motor member, which is substantially perpendicular to an axis of said motor member, and said apparatus body, said motor member being mounted on said vibration preventing member; and a motor position restricting member contacting or adjoining a motor case surface substantially parallel to an axis of said motor member;

wherein said motor position restricting member is so positioned as to obstruct a displacement of a motor case ascribable to a force exerted by said rotary unit on said motor member when said drive unit is driving said rotary unit, but when said writing means does not write a latent image on said image carrier.

4. The apparatus as claimed in claim 3, wherein said motor position restricting member is so located as to contact a motor case surface of said motor member in a direction in which said motor position restricting member supports a weight of said motor member.

5. The apparatus as claimed in claim 3, wherein said rotary unit comprises a developing unit comprising a plurality of developing sections each storing a developer of a particular color, said motor position restricting member is so located as to obstruct a displacement of said motor case ascribable to a force exerted by said developing unit when said developing unit is accelerated, and said writing means does not write a latent image on said image carrier when said developing unit is accelerated.

6. The apparatus as claimed in claim 5, wherein said motor position restricting member is so located as to contact a motor case surface of said motor member in a direction in which said motor position restricting member bears a weight of said motor member.

* * * * *